May 6, 1924.
R. HOUSTON
1,492,799
ONE-PIECE LUMBER FORM AND METHOD OF ECONOMICALLY MAKING SAME
Filed Jan. 10, 1923   2 Sheets-Sheet 1
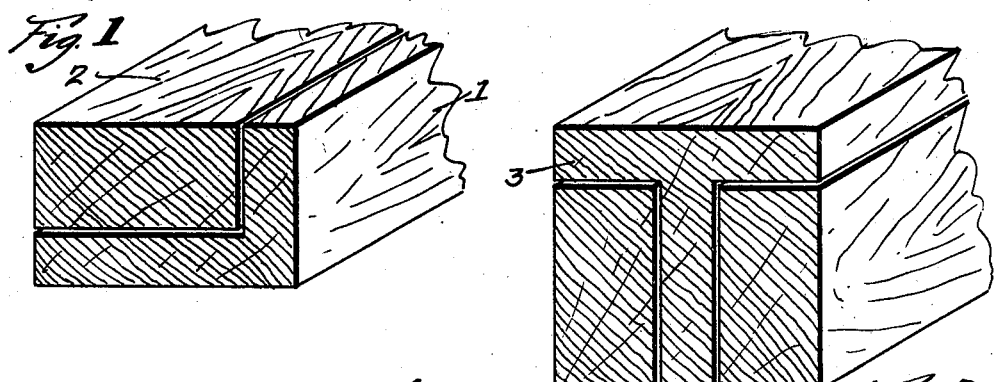
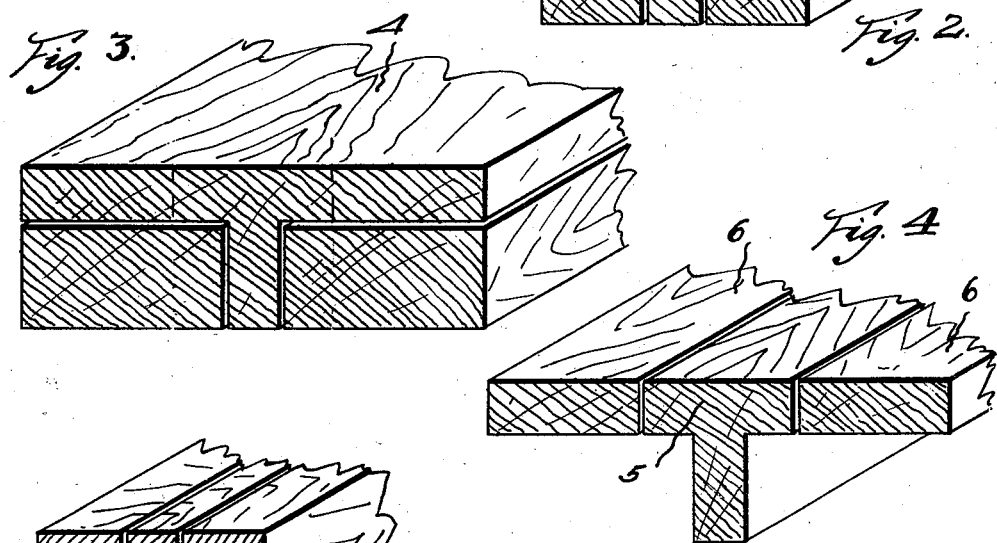
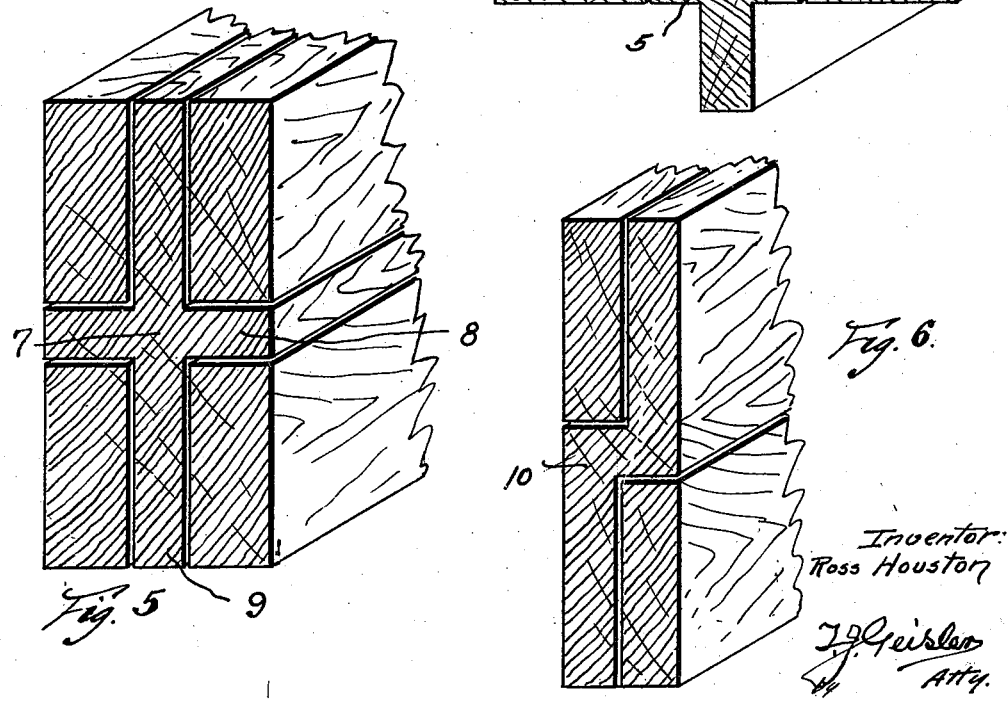

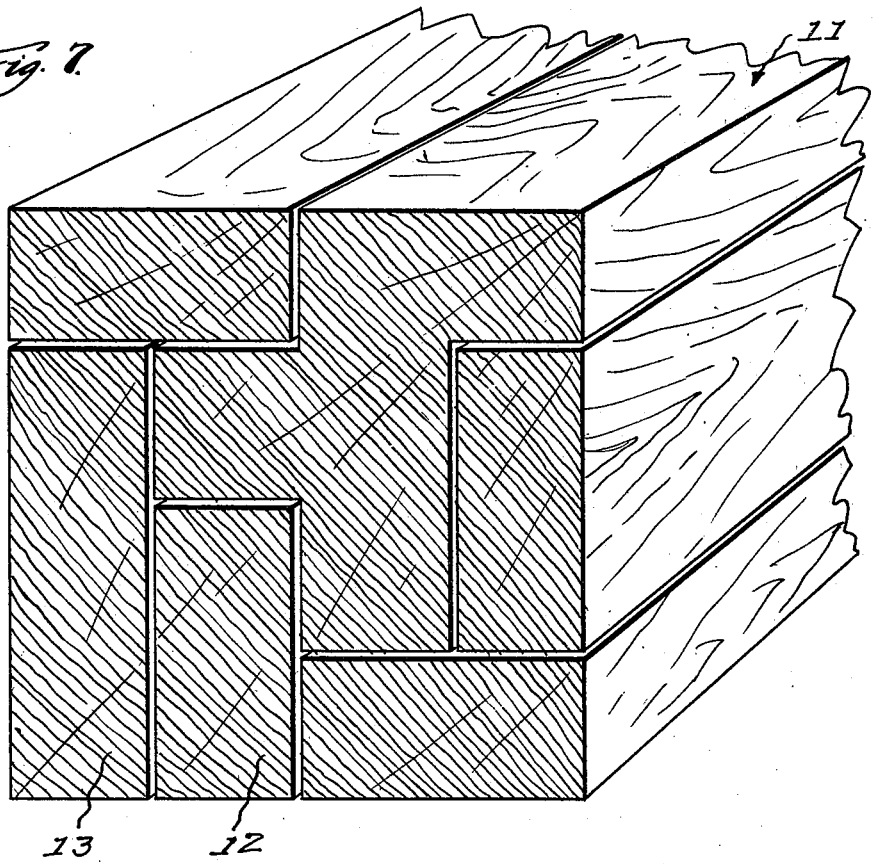

Patented May 6, 1924.

1,492,799

UNITED STATES PATENT OFFICE.

ROSS HOUSTON, OF TACOMA, WASHINGTON.

ONE-PIECE LUMBER FORM AND METHOD OF ECONOMICALLY MAKING SAME.

Application filed January 10, 1923. Serial No. 611,821.

*To all whom it may concern:*

Be it known that I, Ross Houston, a citizen of the United States, and a resident of the city of Tacoma, county of Pierce, and State of Washington, have invented a new and useful Improvement in One-Piece Lumber Forms and Methods of Economically Making Same, of which the following is a specification.

My invention relates to structural and shop forms made of lumber. At present it is the general practice to make up these forms from several pieces of lumber, but if they were made of one piece they would have many advantages over forms made up of several pieces. This fact applies especially where it is desired to retain to a maximum degree the physical properties obtainable in the form, both with regard to the uses for which these forms are serviceable, as well as the inherent strength in material resulting from a one piece form.

An irregular one-piece form cut out of a stick of timber, however, tends to waste the adjacent cross sectional parts of the timber, and thus make the cost of the form so obtained too great for most practical purposes. For this reason the making of one piece forms of lumber has not been followed commercially to any extent, otherwise than in the manufacture of moldings, and other small sized pieces for fittings and ornamental work, where the amount of the wasted portion of the lumber is negligible.

I have discovered that in the producing of a one-piece form of angular but irregular outline—for example a form having a projection or a protuberance perpendicular to its main part—the adjacent sections of the timber from which such form is cut may be commercially utilized to advantage.

The object of my invention is to reclaim the cut away portions of the timber from which a one-piece, irregular form is cut, and thus avoid the wasting of any substantial part of the timber resulting from this operation. The timber of any country is an asset which should not be wasted but conserved, and in my mode of conservation I incidentally obtain a form having the inherent advantages referred to.

I attain my object by cutting the rectangular irregular form from a timber of sufficient cross sectional area so as to include within its perimeter the cross sectional area of one or more other pieces of lumber having standard dimensions and be divisible by re-sawing accordingly. In this form I make further allowance for the material necessarily removed from the timber by the saw kerfs and a further allowance for the finishing of the form and said standard dimension lumber. In carrying my discovery into practice it is necessary that the designs of both the one piece form and the companion nesting standard dimension lumber be such that all cuts of the saw may be made along a plane perpendicular to an exterior face of the timber as illustrated in the accompanying drawings. In this way, as evident, I utilize substantially the entire cross sectional area of the timber.

A further object of my invention is to provide a one piece form of such proportions as to permit the removal therefrom of a lateral or angular section and yet leave each of the remaining pieces of standard dimension stock. Since the sizes of nearly all lumber are at present made to conform with some standard of dimensions the advantages gained by proportioning one piece forms as mentioned are obvious.

A further incidental advantage gained by utilizing the entire cross sectional area of a stick of timber in the making of a one piece form with companion nestable piece or pieces is that these pieces can be renested in the cross sectional form of the timber from which they are cut, and thus the shipping of these pieces may be facilitated. In short, the composite timber obtained by the reassembly of the parts cut therefrom enables the form to be made in a compact manner so that there will be no waste spaces or voids to be covered by freight charges, a fact that will be appreciated by the shipper, consignee and carrier.

It is not necessary that these one piece forms be shipped with the cut away portions, filling out the irregular form so as to make the composite reassembly rectangular, but the irregular forms will nest of their own selves. The cut away portions produced in the forming of this one piece form, do not necessarily have to be sent to the consignee of the one piece form, but may be shipped as standard dimension lumber to another buyer, and thus the cut away portions which have been conserved are the source of considerable revenue even tho they are not shipped with the one piece form.

The method by which I carry my invention into practice and the one piece forms so produced, are hereinafter fully described with reference to the accompanying drawings, in which:

Fig. 1 is a diagrammatic perspective view showing a rectangular timber out of which is cut an irregular form having an L-section, the cut away portion forming a piece of standard dimension lumber;

Fig. 2 is a similar view except that the irregular form has a T-section and the cut away portions form two pieces of standard dimension lumber;

Fig. 3 is a similar section of a one piece form having a T-section with a broad top and the cut away portions making two pieces of standard dimension lumber;

Fig. 4 is a similar perspective showing how the one piece form made in Fig. 3 can be subsequently resawed so that this irregular form and the cut away portions will also be standard dimension lumber;

Fig. 5 is a similar perspective, the section of the irregular form being a cross and the cut away portions making four pieces of standard dimension lumber;

Fig. 6 is a similar view showing how an irregular form of Z-section can be cut and the cut away portions making two pieces of standard dimension lumber; and Fig. 7 is a similar perspective showing how a corner post for a frame house can be sawed from a rectangular timber and the cut away portions can be reclaimed as standard dimension lumber.

The drawings are intended merely to illustrate possible forms that have commercial value because of their adaptability to use in conventional structures. The L-shaped section 1 is used for example, as hand rails for bridges and also for bracketing, and if the timber used was of these dimensions the cut away piece 2 will be a standard two by four, and the timber from which the piece was cut will be a four by six, rough, plus allowances for the saw kerfs. The T-section 3 is used for load carrying members in which the maximum strength may be obtained with the minimum weight. The broad topped T-section 4 is used extensively in the smaller sizes for shelving, and as shown in Fig. 4 may be cut so as to form a smaller size section 5, which is similar in proportions to the T-section in Fig. 3, and when resawed leaves pieces of standard dimension lumber 6. From the cross 7 any of the above sections can be made, as for example, the L-shaped section 1 can be made by sawing off one of the shorter flanges 8 and one of the longer flanges 9. The T-section 3 can be made by sawing off one of the longer sections 9. The wide top T-section 4 can be made by sawing off one of the shorter sections 8, and for all of these resawings allowances are made so that the form can be made to conform to standard dimensions. The Z-section 10 also is adapted to form a great number of irregular designs, such for example, as the L-section 1, and the cut away portions will be standard dimension lumber.

In Fig. 7, the irregular form 11 constitutes a corner post for frame houses and the cut away portions as 12 and 13 are standard dimension lumber.

All of these one piece forms are so proportioned that they will permit the cutting off of a lateral section or an angular section, and at the same time leave the resulting pieces each of a size conforming to the standard dimensions. That is, such sized pieces as have general use in the market.

I claim:

1. The method of producing a plurality of standard size lumber sections from a single piece of lumber without waste of material save that removed by the formation of saw kerfs, consisting in previously cutting a single piece of lumber to predetermined length and of such cross section as to be susceptible of division in cross section into a plurality of pieces each of standard size in cross section; then sawing a kerf of predetermined depth in a plane perpendicular to one exterior face, and relatively spaced from an adjacent face of said single piece; and then sawing another kerf in an adjacent exterior face of said single piece perpendicular to said first mentioned plane and relatively spaced from an adjacent face of said single piece, each of said kerfs being sawed the full length of said piece but in depth only to the point where said planes intersect, whereby are produced lumber sections of standard shapes, and each also of standard size in cross section, one of which sections in each instance has an integral rectangular offset member.

2. The method of producing a plurality of standard size lumber sections from a single piece of lumber without waste of material save that removed by the formation of saw kerfs, consisting in previously cutting a single piece of lumber to predetermined length and of such cross section as to be susceptible of division in cross section into a plurality of pieces each of standard size in cross section; then sawing a kerf of predetermined depth in a plane perpendicular to one exterior face, and relatively spaced from an adjacent face of said single piece; and then sawing another kerf in an adjacent exterior face of said single piece perpendicular to said first mentioned plane and relatively spaced from an adjacent face of said single piece, each of said kerfs being sawed the full length of said piece but in depth only to the point where said planes intersect, whereby are produced lumber sections of standard shapes, and each also of standard size in cross section, one of which sections in each instance has an integral rectangular offset member, with the latter section so proportioned in cross section that its members may subsequently be re-sawed to produce another piece also of standard size and shape in cross section.

3. A nested bundle of pieces of standard-size lumber of the same length, all cut full length from a single rectangular piece of lumber of predetermined size, and all of said pieces of lumber being of standard size and rectangular in cross section, at least one of said pieces of lumber having an integral rectangular offset portion with which the other pieces fit when in bundle form, thus to form with said offset piece a rectangular, cross sectional area within whose perimeter all of said pieces lie.

4. A nested bundle of pieces of standard-size lumber of the same length, all cut full length from a single rectangular piece of lumber of predetermined size, and all of said pieces of lumber being of standard size and rectangular in cross section, at least one of said pieces of lumber having an integral rectangular offset portion with which the other pieces fit when in bundle form, thus to form with said offset piece a rectangular, cross sectional area within whose perimeter all of said pieces lie, the said piece of lumber having an offset being so proportioned in cross section that its members may subsequently be re-sawed to produce another rectangular piece also of standard size in cross section.

ROSS HOUSTON.